United States Patent
Thompson et al.

(10) Patent No.: US 6,174,484 B1
(45) Date of Patent: Jan. 16, 2001

(54) APPARATUS AND METHOD FOR PRODUCING A COMPRESSION MOLDED PRODUCT

(75) Inventors: Paul Shadforth Thompson, Stephentown; Johannes Martinus van Oort, Niskayuna, both of NY (US)

(73) Assignee: General Electric Company, Schenectady, NY (US)

( * ) Notice: Under 35 U.S.C. 154(b), the term of this patent shall be extended for 0 days.

(21) Appl. No.: 09/193,085

(22) Filed: Nov. 16, 1998

(51) Int. Cl.⁷ .............................. B29C 43/00; B29C 43/52
(52) U.S. Cl. .......................... 264/314; 425/394; 425/412; 425/417; 249/142
(58) Field of Search ............................ 264/314; 249/144, 249/142; 425/417, 412, 394, DIG. 14, DIG. 47

(56) References Cited

U.S. PATENT DOCUMENTS

| | | | |
|---|---|---|---|
| 2,981,976 | * 5/1961 | Maier | 425/417 |
| 3,165,569 | * 1/1965 | Bright | 264/313 |
| 5,084,219 | * 1/1992 | Sigur | 264/313 |
| 5,560,883 | 10/1996 | Lane et al. | 264/266 |
| 5,817,269 | 10/1998 | Younie et al. | 264/258 |

FOREIGN PATENT DOCUMENTS

| | | |
|---|---|---|
| 0415207 | 3/1991 | (EP) . |
| 0505738 | 9/1992 | (EP) . |
| 0862978 | 9/1998 | (EP) . |

OTHER PUBLICATIONS

Plastics Mold Engineering Handbook, 3rd ed. New York, Van Nostrand Reinhold Company, 1978. pp. 112–137.*

* cited by examiner

*Primary Examiner*—Harold Pyon
*Assistant Examiner*—Thukhanh T. Nguyen

(57) ABSTRACT

A compression molding apparatus includes a mold of a first material having a first coefficient of thermal expansion and a plug of a second material having a second coefficient of thermal expansion different from the first coefficient of thermal expansion. The mold has a cavity into which the plug is placed such that the mold and plug are disposed relative to one another providing a gap therebetween having a first volume for holding a body that at least partially fills the gap when the mold and plug are at a first temperature and for molding the body into a molded product when the mold and plug are subjected to a second temperature that causes one of the first and second materials of the mold and plug to change in size more than the other and thereby change the gap to a second volume different from the first volume and compress the body.

15 Claims, 1 Drawing Sheet

APPARATUS AND METHOD FOR PRODUCING A COMPRESSION MOLDED PRODUCT

BACKGROUND OF THE INVENTION

The present invention generally relates to compression molding and, more particularly, is concerned with an apparatus and method for producing a compression molded product.

In a compression molding process, a body of material is typically placed directly in a cavity of the mold of a die set and compression molding takes place under application of pressure with the plug of the die set. Many fiber-reinforced composite structures are formed using this process. In order to obtain good bonding between the reinforcing fibers and polymer matrix of a composite material as well as to protect the fibers during subsequent molding, the reinforcing fibers are surface treated by impregnation to enhance adhesion to the polymer matrix. The resulting partially cured material is commonly called a prepreg.

Pressure is applied to the mold and/or plug of the die set to accomplish the compression into the desired form of the prepreg lay-up in the mold. Pressure can be applied by a vacuum-bagging technique wherein the pressure required to form the shape and create good bonding is obtained by covering the lay-up prepreg with a plastic bag and then creating a vacuum in the mold cavity. Heat is also applied to fully cure the material. If additional heat and pressure are desired, the entire die set and prepreg are placed in an autoclave.

A problem of the above-described conventional compression molding process is the high cost and complexity associated with the conventional application of heat and pressure to the process. Consequently, a need still exists for an innovation which will provide a solution to the aforementioned problem.

BRIEF SUMMARY OF THE INVENTION

The present invention provides a compression molding apparatus and method designed to satisfy the aforementioned need. The compression molding apparatus and method of the present invention employs thermal expansion differential between the plug and mold of the molding die set to produce the pressure necessary to make structures with repeatable results ensuring a quality finished product. The molding apparatus and method of the present invention eliminates the need for vacuum-bagging and autoclaving to produce the required pressure and temperature to cure the fiber-reinforced composite prepreg structure.

In an embodiment of the present invention, a compression molding apparatus is provided which comprises a mold formed of a first material having a first coefficient of thermal expansion, and a plug formed of a second material having a second coefficient of thermal expansion different from the first coefficient of thermal expansion of the first material of the mold. One of the mold and plug has a cavity into which the other of the mold and plug is placed such that the one is disposed relative to the other so as to provide an air gap between them having a first volume for holding a body of a third material at least partially filling the gap when the mold and plug are at a first temperature and for molding the body into a molded product when the mold and plug are subjected to a second temperature that causes one of the first and second materials of the mold and plug to change in size more than the other and thereby change the air gap to a second volume different from the first volume and compress the body between the plug and mold into the molded product. The change in the volume of the gap is caused essentially only by the change in temperature.

As an example, the second coefficient of thermal expansion of the second material of the plug is greater than the first coefficient of thermal expansion of the first material of the mold such that the first material of the mold expands during the change in temperature from the first temperature to the second temperature but to a lesser degree than the second material of the plug during the change in temperature from the first temperature to the second temperature. Furthermore, the second temperature is greater than the first temperature. The first temperature can be about room temperature whereas the second temperature can be about 250° Fahrenheit. The third material of the body can be a composite structure, such as a structure having graphite fibers embedded in an epoxy matrix.

The present invention also provides a compression molding method which comprises the steps of providing a mold of a first material having a first coefficient of thermal expansion and defining an open cavity, providing a plug of a second material having a second coefficient of thermal expansion different from the first coefficient of thermal expansion, positioning the mold relative to the plug with a body of a third material in the cavity of the mold and at a first temperature such that an air gap having a first volume is established between the plug and mold and the body at least partially fills the gap, and changing from the first temperature to a second temperature so as to cause one of the first material of the mold and the second material of the plug to expand relative to the other and thereby decrease the volume of the air gap and compress the body to a predetermined size and configuration between the plug and mold. The change in the volume of the gap is caused essentially only by the change in temperature.

DETAILED DESCRIPTION OF THE INVENTION

Figure 1:
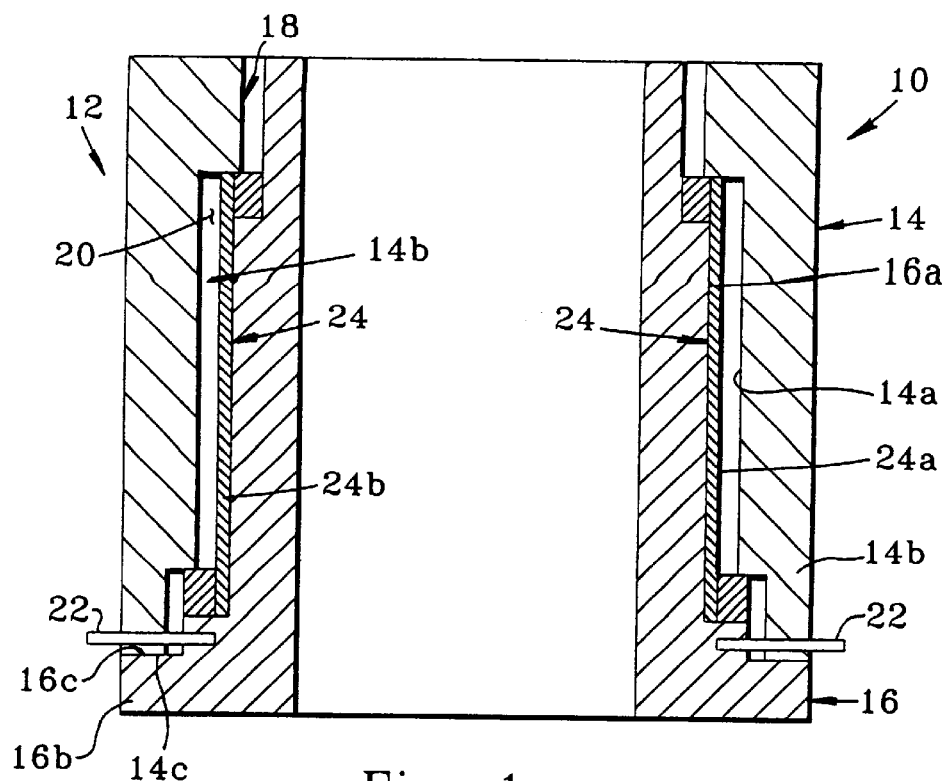
FIG. 1 is a schematic sectional view of a mold and plug of a die set of a compression molding apparatus of the present invention before their differential thermal expansion in accordance with a molding method of the present invention to produce a molded product.
Figure 2:
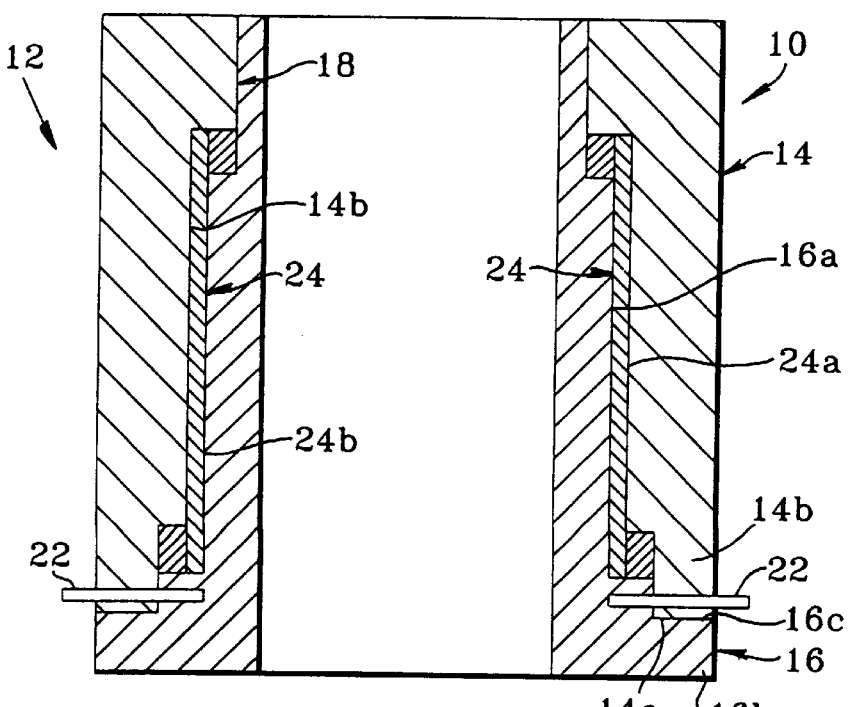
FIG. 2 is a schematic sectional view of the mold and plug of the die set of the compression molding apparatus after their differential thermal expansion to produce the molded product.

Referring now to the FIGS. 1 and 2 of the drawings, there is illustrated a compression molding apparatus of the present invention, generally designated 10, employing differential thermal expansion in accordance with a molding method of the present invention to produce a finished molded product. The compression molding apparatus 10 basically includes a die set 12 having a mold 14 and a plug 16 wherein the mold 14 is made of a first material having a first coefficient of thermal expansion and the plug 16 is made of a second material having a second coefficient of thermal expansion different from the first coefficient of thermal expansion. The mold 14 has an internal cavity 18 permitting the mold 14 to be disposed over and removed from the plug 16 such that an air gap 20 having a first volume is established between the mold 14 and plug 16 when the mold 14 is disposed over the plug 16 and they are at a first temperature, such as room temperature or about 75° F. The mold 14 is fixtured by circumferentially spaced pins 22 to the plug 16 such that the mold 14 and plug 16 are accurately positioned with respect to each other along a central longitudinal axis A and further such that at the first, or room, temperature the air gap 20 of the first volume exists between the interior surface 14a of the mold 14 and a portion of the exterior surface 16a of the plug 16. The circumferentially spaced apart pins 22 in fixturing the mold 14 to the plug 16 extend along directions B transversely to the central longitudinal axis A and through and across the portion of the air gap 24 between the mold 14 and plug 16 at the locations of the pins 22 when the mold and plug are at the first temperature, as seen in FIG. 1.

A body 24 of a third material, different from the first and second materials of the mold 14 and plug 16, is provided for molding into a finished product when subjected to the differential thermal expansion between the mold 14 and plug 16. The third material can be any moldable material such as, but not limited to, a plastic material or a composite material, such as a composite material having graphite fibers embedded in an epoxy matrix wherein the body 24 is (although not required to be) a graphite fiber prepreg. Before the mold 14 is positioned over the plug 16, the prepreg body 24 is laid onto the plug 16 to assume the position as shown in FIG. 1. The body 24 at least partially fills the air gap 20 between the mold 14 and plug 16 when the plug 16 is disposed within the internal cavity 18 of the mold 14 at the first temperature, as shown in FIG. 1. The body 24 is compressed to a configuration and predetermined size by the differential thermal change, such as expansion, between the mold 14 and plug 16 as the mold 14 and plug 16 are changed from the first temperature to a second temperature, such as 250° F. The temperature change during the "cure" causes one of the first and second materials of the mold 14 and plug 16 to change, expand or contract depending upon the materials, such that the air gap 20 decreases from the larger first volume to the smaller second volume and the body 24 is compressed between the mold 14 and plug 16, as shown in FIG. 2. The change in the volume of the gap 20 is caused essentially only by the change in temperature. Furthermore, with the pins 22 extending transversely to the central longitudinal axis A in fixturing the mold 14 to the plug 16, the portion of the air gap 24 at the locations of the pins 22 is allowed to change from the size shown in FIG. 1 to that shown in FIG. 2 as the mold 14 and plug 16 are changed front the first temperature to the second temperature.

The mold 14 can have a substantially clam shell-type construction, though it may have any other suitable construction, so that it can be opened and closed over the plug 16 permitting insertion or laying of the prepreg body 24 onto the plug 16 and removal of the molded product therefrom. The mold 14 and plug 16 can have any suitable sizes. By way of example only, the mold 14 can be made of carbon steel while the plug 16 can be made of stainless steel. Further, the mold 14 and plug 16 can be of right cylindrical shapes, although other shapes can be utilized. Complicated shapes can be molded using plugs that can be taken apart. The plug 16 could have a slight taper to allow the molded product to be pushed off without the possibility of structural damage.

The first material of the mold 14 must be of sufficient strength to constrain the plug 16 during thermal expansion thereof. The cavity 18 of the mold 14 also has a desired configuration as defined by the interior surface 14a of the mold 14 so as to provide the desired outside geometry of the finished composite structure. The outside geometry is formed, such as by machining, onto the interior surface 14a of the mold 14. Where the first material of the mold 14 is carbon steel, the first coefficient of thermal expansion is $6.5 \times 10^{-6}$ in/in ° F. Where the second material of the plug 16 is stainless steel, the second coefficient of thermal expansion is $10.0 \times 10^{-6}$ in/in ° F. and thus is greater than the first coefficient of thermal expansion of the first material. Thus, the first material of the mold 14 will change as the temperature changes from the first temperature to the second temperature but to a lesser degree than the second material of the plug 16 as the temperature changes from the first temperature to the second temperature. As mentioned above, by way of example the second temperature is greater than the first temperature whereby the differential change in size that occurs is a greater expansion of the second material of the plug 16 than of the first material of the mold 14. The first temperature may be room temperature. The second temperature may be 250° F. The first and second materials of the mold 14 and plug 16 expand and contract by the following known equation of thermal expansion: $L_2 = L_1 + \alpha L_1 \Delta T$. In the equation, "$\alpha$" is the coefficient of thermal expansion, "$\Delta T$" is the temperature difference $(T_2 - T_1)$, where "$T_1$" is the first temperature and "$T_2$" is the second temperature, "$L_1$" is the length of the material at the first temperature "$T_1$," and "$L_2$" is the length of the material at the second temperature "$T_2$."

As mentioned previously, the mold 14 is fixtured to the plug 16 at lower end portions 14b, 16b thereof such that the respective surfaces 14c, 16c on the lower end portion 14b, 16b of the mold 14 and plug 16 are maintained substantially flush in relation to one another. The mold 14 and the plug 16 may be fixtured to one another by any suitable means, such as by the pins 22. The fixturing of the mold 14 to the plug 16 is necessary for accuracy in positioning them in relation to one another. The air gap 20 existing between the mold 14 and plug 16 can have any suitable size and configuration depending upon the size of the body 24 and amount of differential thermal expansion that is to occur. Before curing begins, the body 24 has an initial predetermined configuration. During the curing process, the exterior surface 24a of the body 24 takes on the configuration of the interior surface 14a of the mold 14 while the interior surface 24b of the body 24 takes on the configuration of the exterior surface 16a of the plug 16. The body 24 may, therefore, take on any desired and suitable configuration, depending upon the configurations of the mold 14 and the plug 16. The third material of the body 24 is a composite structure. The composite structure of the body 24 is reinforced by fiber, such as by graphite fiber.

The compression molding method employing the apparatus 10 includes the steps of providing the mold 14 of the first material having the first coefficient of thermal expansion and defining the internal cavity 18, providing the plug 16 of the second material having the second coefficient of thermal expansion, and positioning the mold 14 relative to the plug 16 with the body 24 in the cavity 18 of the mold 14 and at a first temperature such that an air gap 20 having a first volume is established between the mold 14 and plug 16 and the body 24 at least partially fills the air gap 20. The first temperature is then changed to a second temperature so as to cause one of the first material of the mold 14 and the second material of the plug 16 to expand relative to the other and thereby decrease the volume of the air gap 20 and compress the body 24 to a predetermined size and configuration between the mold 14 and plug 16. The change in the volume of the gap 20 is caused essentially only by the change in temperature. The step of changing from the first to the second temperature causes expansion of the first material of the mold 14 but to a lesser degree than the expansion of the second material of the plug 16. The mold 14 must be removed from the plug 16 and the body 24 after curing at the second temperature because the body 24 may not shrink as much as the mold 14 in the process of going from the second to the first temperature. Pressures greater than 100 psi can be achieved through this method of compression molding.

It should be further understood that the above described compression molding process could be carried out in a vacuum or after the molding process, the air could be extracted from the molding apparatus 10 in which case the air gap 20 would be referred to as a gap or a vacuum gap 20. By so extracting the air, you can eliminate air voids in the body 24 of the third material, such as a composite material containing graphite fibers. It is noted that this vacuum only eliminates voids and does not compress the body 24.

It is thought that the present invention and its advantages will be understood from the foregoing description and it will be apparent that various changes may be made thereto without departing from the spirit and scope of the invention or sacrificing all of its material advantages, the form hereinbefore described being merely an exemplary embodiment thereof.

What is claimed is:

1. A compression molding apparatus, comprising:

a mold made of a first material having a first coefficient of thermal expansion;

a plug made of a second material having a second coefficient of thermal expansion different from said first coefficient of thermal expansion of said first material of said mold, one of said mold and plug having a cavity into which the other of said mold and plug is placed such that the one is disposed relative to the other along a central longitudinal axis so to provide a gap between said mold and plug having a first volume for holding a body of a third material different from the first and second materials at least partially filling said gap when said mold and plug are at a first temperature and for molding the body into a molded product when said mold and plug are subjected to a second temperature that causes one of said first and second materials of said mold and plug to change in size more than the other and thereby change said gap to a second volume different from said first volume and compress the body between said mold and plug into the molded product, wherein the change in the volume of the gap is caused essentially only by the change in temperature; and a plurality of pins circumferentially spaced apart and extending in a transverse direction relative to said central longitudinal axis so as to fixture said mold to said plug such that said mold and plug are allowed to undergo relative expansion and contraction toward and away from one another by said pins extending through and across a portion of said gap between said mold and plug at the locations of said pins when said mold and plug are at said first temperature and permitting the size of said gap at said locations of said pins to change as said mold and plug are changed from said first temperature to said second temperature.

2. The apparatus of claim 1 in which said mold can be disposed over and removed from said plug such that said gap of said first volume exists between said mold and plug when said mold is disposed over said plug.

3. The apparatus of claim 1 in which said first material of said mold is carbon steel and said second material of said plug is stainless steel.

4. The apparatus of claim 1 in which said second coefficient of thermal expansion of said second material of said plug is greater than said first coefficient of thermal expansion of said first material of said mold.

5. The apparatus of claim 1 in which said mold and plug are cylindrical in configuration.

6. A compression molding method, comprising the steps of:

providing a mold of a first material having a first coefficient of thermal expansion and defining a cavity;

providing a plug of a second material having a second coefficient of thermal expansion different from the first coefficient of thermal expansion;

positioning the mold relative to the plug such that the one is disposed relative to the other along a central longitudinal axis so to provide a gap between the mold and plug with a body of a third material different from the first and second materials of the mold and plug disposed in the gap therebetween and at a first temperature such that the gap has a first volume and the body at least partially fills the gap;

subjecting the mold and plug to a second temperature different from the first temperature so as to cause one of the first material of the mold and the second material of the plug to change in size relative to the other and thereby change the gap to a second volume different from the first volume and in a transverse direction relative to the central longitudinal axis and compress the body between the mold and plug into a molded product, wherein the change in the volume of said gap is caused essentially only by the change in temperature; and providing a plurality of pins circumferentially spaced apart from one another and extending in the transverse direction relative to the central longitudinal axis so as to fixture the mold to the plug such that the mold and plug are allowed to undergo relative expansion and contraction toward and away from one another by the pins extending through and across a portion of said gap between said mold and plug at the locations of said pins when said mold and plug are at said first temperature and permitting the size of said gap at said locations of said pins to change as said mold and plug are changed from said first temperature to said second temperature.

7. The method of claim 6 in which said positioning of the mold includes the step of disposing the mold over the plug such that the gap of the first volume exists between the mold and plug when the mold is disposed over the plug.

8. The method of claim 6 in which the first material of the mold is carbon steel and the second material of the plug is stainless steel.

9. The method of claim 6 in which the second coefficient of thermal expansion of the second material of the plug is greater than the first coefficient of thermal expansion of the first material of the mold.

10. The method of claim 6 in which the second temperature is greater than the first temperature.

11. The method of claim 6 in which the first temperature at which the gap has the first volume is about room temperature.

12. The method of claim 6 in which the second temperature at which the gap has the second volume is about 250° F.

13. The method of claim 6 in which the third material of the body is a composite structure.

14. The method of claim 6 in which the composite structure of the body includes reinforcing fibers.

15. The method of claim 6 in which the mold and plug are provided in cylindrical configurations.

* * * * *